United States Patent [19]

Dames

[11] Patent Number: 5,126,020

[45] Date of Patent: * Jun. 30, 1992

[54] DETOXIFICATION APPARATUS AND METHOD FOR TOXIC WASTE USING AN ENERGY BEAM AND ELECTROLYSIS

[76] Inventor: Robert G. Dames, 4444 Green Valley Dr., Arnold, Mo. 63010

[*] Notice: The portion of the term of this patent subsequent to Feb. 10, 2007 has been disclaimed.

[21] Appl. No.: 549,486

[22] Filed: Jul. 6, 1990

Related U.S. Application Data

[63] Continuation-in-part of Ser. No. 211,767, Jun. 27, 1988, Pat. No. 4,940,519.

[51] Int. Cl.$^5$ .............................. C02F 1/461; C02F 1/30
[52] U.S. Cl. ................................. 204/130; 204/131; 204/157.15; 204/157.41; 204/157.61; 204/275; 110/237; 219/121.74; 219/121.76; 219/121.84; 219/121.85
[58] Field of Search ............... 204/157.15, 157.41, 204/157.61, 130, 131, 275; 110/237, 238, 250, 346; 219/121.74, 121.76, 121.84, 121.85

[56] References Cited

U.S. PATENT DOCUMENTS

| | | | |
|---|---|---|---|
| 3,458,140 | 7/1969 | Schryver | 219/121.6 |
| 3,719,454 | 3/1973 | Shang | 219/121.6 |
| 3,808,672 | 5/1974 | Castro et al. | 219/121.84 |
| 4,012,301 | 3/1977 | Rich | 204/DIG. 11 |
| 4,076,515 | 2/1978 | Rickard | 71/10 |
| 4,230,546 | 10/1980 | Ronn | 204/DIG. 11 |
| 4,246,255 | 1/1981 | Grantham | 423/245 |
| 4,341,738 | 7/1982 | Kemmler | 422/184 |
| 4,351,978 | 9/1982 | Hatano | 585/469 |
| 4,367,130 | 1/1983 | Lemelson | 204/157.42 |
| 4,397,823 | 8/1983 | Dimpfl | 422/186 |
| 4,425,856 | 1/1984 | Szilagyi | 110/238 |
| 4,481,891 | 11/1984 | Takeshita et al. | 110/238 |
| 4,529,489 | 7/1985 | McDonald | 210/748 |
| 4,547,650 | 10/1985 | Arditty et al. | 219/121.74 |
| 4,549,966 | 10/1985 | Beall | 210/661 |
| 4,585,533 | 4/1986 | Habeeb | 204/131 |
| 4,672,169 | 6/1987 | Chambers | 219/121.6 |
| 4,702,804 | 10/1987 | Mlazur et al. | 204/131 |

Primary Examiner—T. Tung
Assistant Examiner—David G. Ryser
Attorney, Agent, or Firm—Polster, Lieder, Woodruff & Luccesi

[57] ABSTRACT

Detoxification apparatus for disposing of toxic waste material by incineration includes a closed reactive vessel (3) having an inlet (5) and an outlet (7). Waste material is introduced into the vessel in a fluid state and a laser (19) or other energy beam produces a high energy beam within the vessel. The waste material passes through the beam and the beam energy creates very high temperatures within the material that incinerates or ionizes the toxic waste. The detoxified material is electrolyzed and removed from the vessel for further processing.

14 Claims, 6 Drawing Sheets

DETOXIFICATION APPARATUS AND METHOD FOR TOXIC WASTE USING AN ENERGY BEAM AND ELECTROLYSIS

CROSS-REFERENCE TO RELATED APPLICATION

This application is a continuation-in-part of copending prior application Ser. No. 07/211,767, filed June 27, 1988, now U.S. Pat. No. 4,940,519, issued July 10, 1990.

BACKGROUND OF THE INVENTION

This invention relates to waste disposal and, more particularly, to apparatus and method for safely disposing of toxic waste material such as polychlorinated biphenyls (PCB).

Recent public and governmental concern over environmental pollution has focused intense pressure on industry to develop safe disposal techniques for toxic wastes which endanger the air we breathe, the soil we grow things in, the plants and animal life with which we are surrounded, as well as ourselves. The continued growth of our economy means that, for the time being at least, large amounts of toxic waste will continue to be produced and need to be disposed of. Of the current disposal methods, landfills, for example, are rapidly being filled and fewer new landfills are opening up. In addition, not all waste can be disposed of in them. With respect to certain of the more toxic wastes such as PCB's and dioxin, the safest disposal method is burning or incineration. Yet, the large combustion furnaces currently available for use are very expensive, not only because of their size, but also because of the environmental safe-guards which must be built into them. Consequently, they are few in number and there is vociferous opposition to building new ones in various areas as well as transporting contaminated materials from remote sites to them. And yet, failure to provide available disposal facilities may mean more sites like Love Canal in New York or Times Beach, in Missouri will develop.

The present apparatus solves those and other problems in a manner not revealed by the known prior art.

SUMMARY OF THE INVENTION

Among the several aspects of the present invention may be noted the provision of apparatus and a method for the disposal of toxic waste such as PCB, dioxin, and other, primarily organic wastes, and the provision of such apparatus and method for the safe disposition of molecular (organic) wastes by very high temperature incineration of the waste material in a reactive vessel by the application of an intense laser beam or other energy beam onto the waste material The energy beam is preferably a focused source of high-energy ionizing radiation, and the waste material is preferably introduced into the radiation beam in finely divided form. Another aspect of this invention is the provision of such apparatus and method which include secondary treatment of the waste material, either before or after treatment with the energy beam, by electrolysis. The device and method are of relatively low cost and can be readily constructed at sites near toxic waste sources.

Yet another aspect of this invention is the provision of such apparatus and method which is controlled and monitored to insure complete disposal of toxic wastes; and, the provision of such apparatus and method to produce end products which can be exhausted into the atmosphere.

BRIEF DESCRIPTION OF THE DRAWINGS

FIG. 5 is a schematic representation of a fourth possible construction of the apparatus using a conveyor;

Corresponding reference character indicate corresponding parts throughout the several view of the drawings.

DESCRIPTION OF PREFERRED EMBODIMENTS

Referring to the drawings, detoxification apparatus for safely disposing of toxic waste material is indicated generally 1. Apparatus 1 is designed to dispose of organic wastes such as polychlorinated biphenyls (PCB's) or dioxin by very high temperature incineration. Since most organic compounds contain hydrogen, carbon and oxygen together with such other elements as nitrogen, sulfur, phosphorus, chlorine, bromine and iodine, highly toxic compounds such as those noted above, can be broken down into safe compounds which are primarily oxides of the other elements listed; e g., sulfur dioxide ($SO_2$), nitrous oxide ($N_xO_x$), etc.

Figure 1:
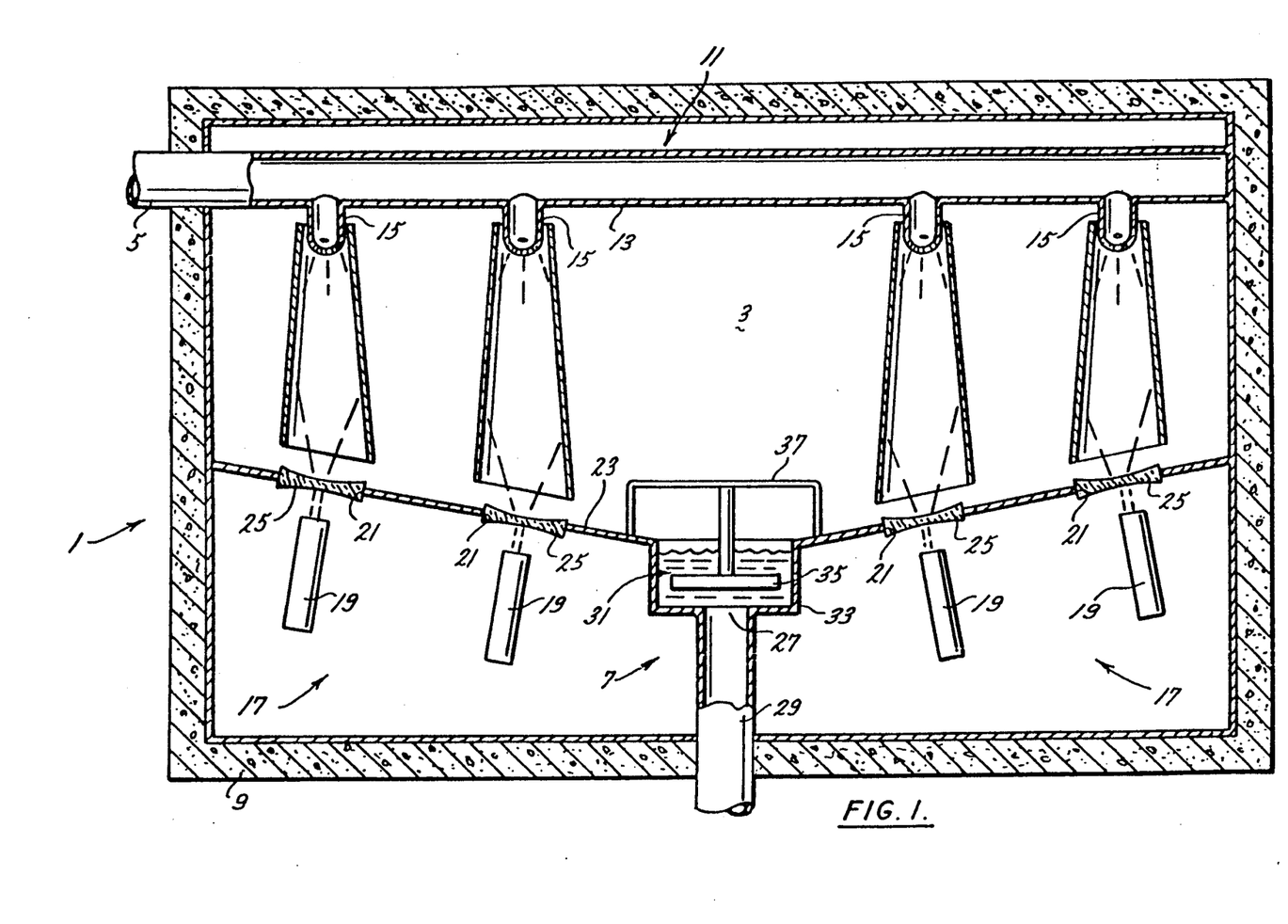
FIG. 1 is a schematic representation of one possible construction of the apparatus of the present invention.

As shown in the drawings, apparatus 1 comprises a closed, reactive vessel 3 having at least one inlet 5 and at least one outlet 7. The reactive vessel is constructed of a high-strength alloy such as a titanium steel which has a high melting point and is corrosion resistant. As shown in FIG. 1, vessel 3 may be encased in a layer 9 of reinforced concrete and can be buried underground.

Toxic waste material is introduced into the reactive vessel via an ingress means 11. As shown in FIG. 1, means 11 comprises a waste pipe 13 which traverses the vessel through inlet 5. At least one spray nozzle 15 is fitted to the waste pipe (four such nozzles being shown in FIG. 1) for the waste material to be sprayed into the vessel. Thus the waste material is in a fluid state (a mist) when introduced into the vessel.

A laser means 17 produces a high energy laser beam within the vessel, means 17 including at least one high energy laser 19. As shown in FIG. 1, four high energy lasers (one for each spray nozzle) are positioned outside vessel 3 which has a corresponding aperture 21 in its base wall or floor 23 for the laser beam produced by each laser to enter the vessel An optical window, which may preferably be a divergent lens 25 is fitted into each aperture; the lens serving to defocus or increase the cross-sectional area of the laser beam entering the vessel.

The spray of waste material ejected through the nozzles pass through the laser beams generated by the lasers. This, in turn, creates very high temperatures within the waste material which incinerates the toxic waste. As the fine particles of the mist sprayed through the laser beams strike floor 23 of the vessel and condense, they run down the floor, which is sloped downwardly toward the center of the vessel to a drain 27. A waste removal pipe 29 is affixed to the drain to carry the detoxified material away for further processing.

To enhance the detoxification process, the bottom of vessel 1, around drain 27, is shaped to form a bath 32 in which the waste material collects The side walls and floor of the bath are metal and comprise a cathode 33. An anode 25 which may be of graphite, is suspended from rods 37, which may also be of graphite, into the bath. An electrical current flows between the anode and cathode with the collected waste material serving as the conducting medium. The electrical current which is produced if a high voltage is generated between the anode and cathode electrolyzes the liquid residue from the laser incineration and creates gases which are drawn into the outlet system for further processing. To enhance electrolysis, small amounts of non-metallic salt solutions could be sprayed into the bath. Electrolysis is also enhanced by ionization of the waste material by the lasers 19.

With the basic apparatus now set forth, other embodiments are now described to introduce various refinements and alternate ways to implement the invention.

Figure 2:
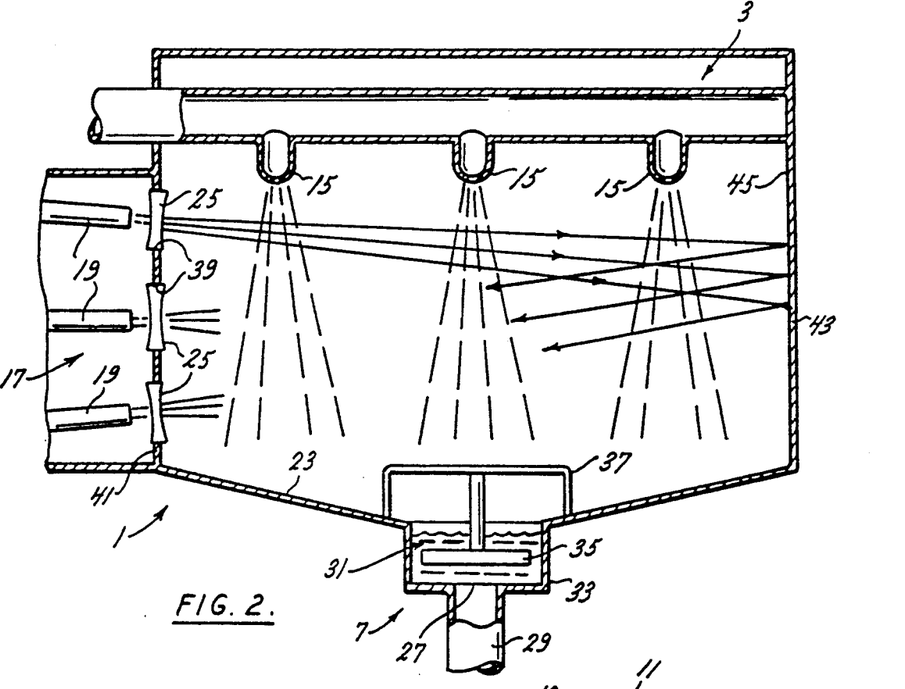
FIG. 2 is a schematic representative of a second possible construction of the apparatus.
Figure 4:
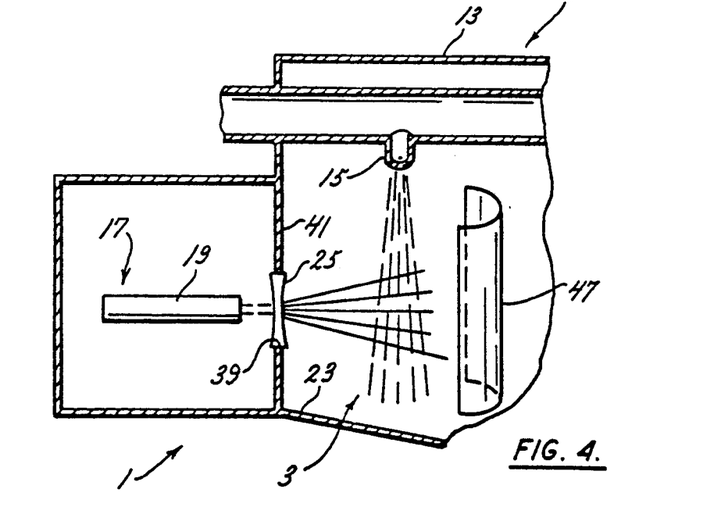
FIG. 4 is a partial schematic representation of a construction similar to that shown in FIG. 2, but utilizing a parabolic reflector.

Referring to FIG. 2, the fine mist spray from nozzles 15 is directed vertically downward toward base wall or floor 23 of vessel 1. Now, however, lasers 19 are positioned outside the vessel and direct their laser beams through lenses 25 which are fitted in apertures 39 in a side wall 41 of the vessel. Three lasers 19 are shown in FIG. 2, with the middle laser directing its beam horizontally across the vessel while the upper and lower lasers are canted so their beams are angled across the vessel. The metal wall 43 opposite the lasers has a highly polished interior surface 45 which acts as mirror and reflects impinging laser beam energy back into the vessel to enhance the incineration process. Surface 45 thus acts as a reflection means for bouncing a laser beam about the interior of the vessel. An alternative to the mirrored surface 45 is shown in FIG. 4, where a parabolic reflector 47 is mounted within the vessel and a laser beam from a laser 19 is directed at the reflector.

Figure 3:
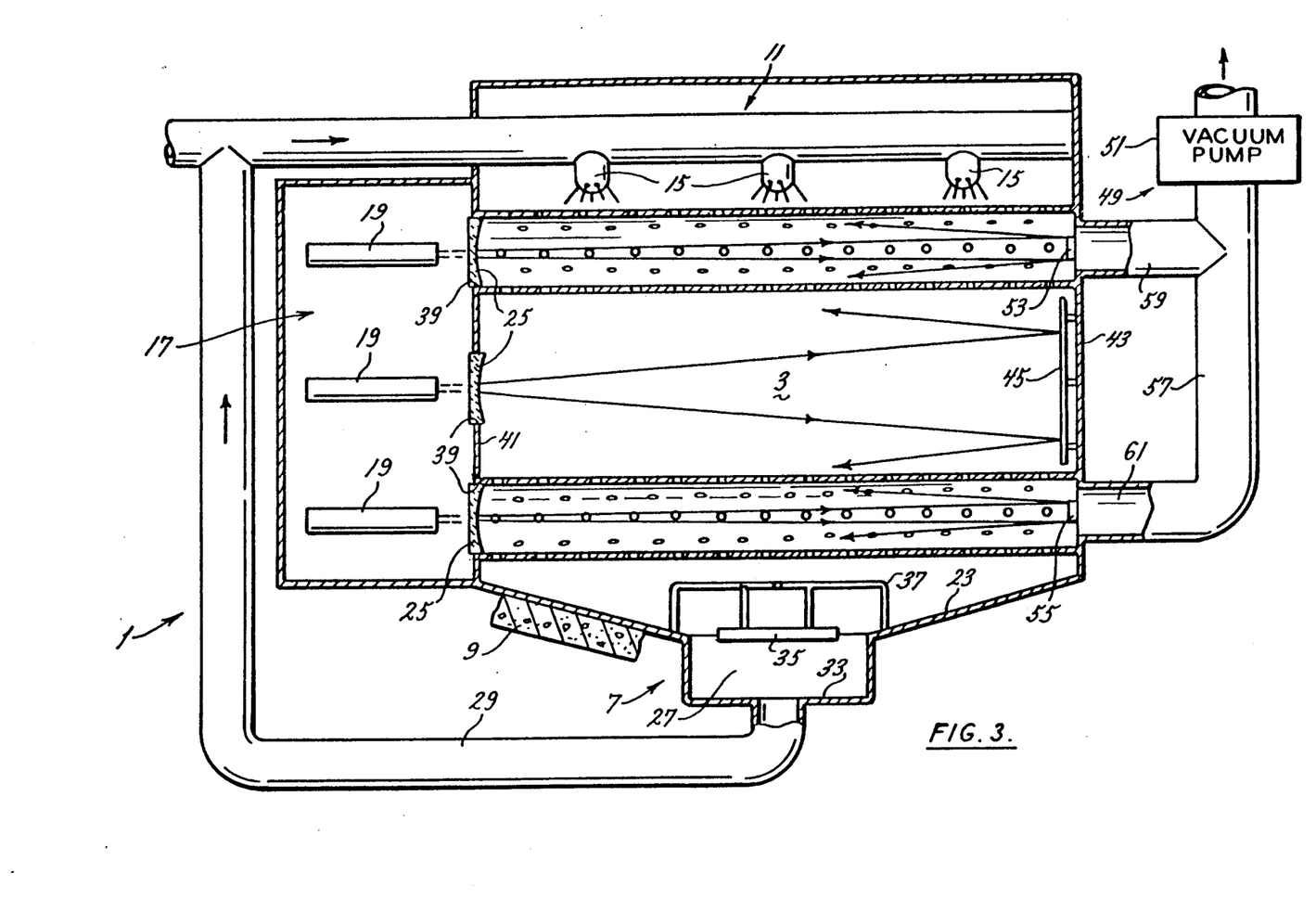
FIG. 3 is a schematic representation of a third possible construction of the apparatus employing a vacuum system.

Referring to FIG. 3, a vacuum means 49 comprises a vacuum pump 51 which is connected to suction ports 53 and 55. These ports are respectively formed in the upper and lower reaches of wall 43 and are connected to the pump via vacuum lines 57, 59 and 61. Of the three lasers 19 shown in FIG. 3, the upper and lower lasers are now aligned so their laser beams are directed at the respective parts 53 and 55. The middle laser has its beam directed at the surrounded surface 45 of the wall. In operation, the suction created by vacuum means 49 draws the toxic particle mist toward ports 53 and 55. Since two of the laser beams are directed at these ports, the amount of incineration is increased because the waste material has a prolonged exposure to the high energy laser beams.

Figures 5, 7:
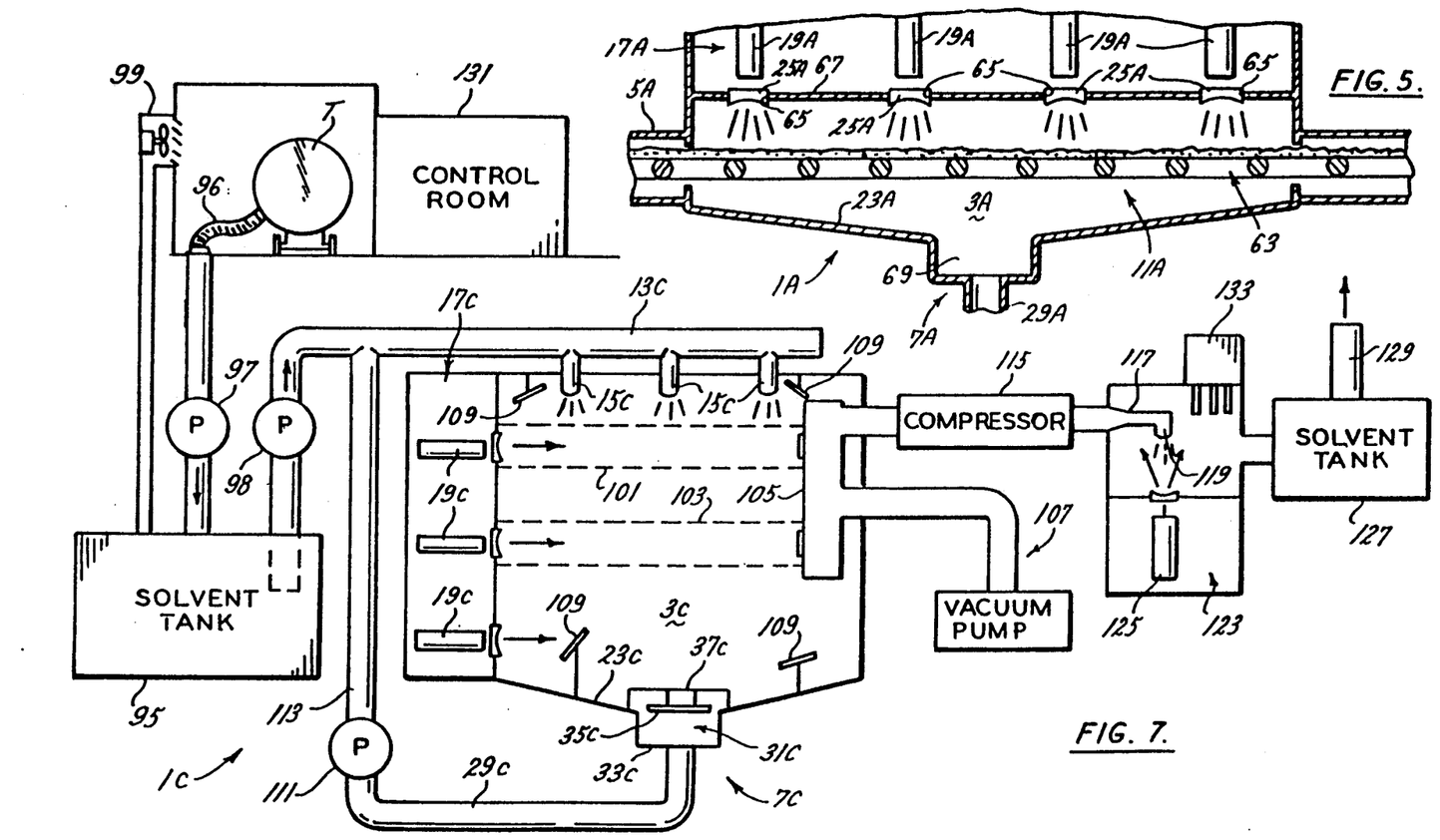

Referring to FIG. 5, apparatus IA is similar to apparatus 1 previously described except that ingress means 11A comprises a conveyor transporting the waste through reactive vessel 3A. A number of lasers 19A (four being shown in FIG. 5) are positioned above the vessel and direct high energy laser beams onto the material through apertures 65 in the top wall or onto the material through apertures 65 in the top wall or onto the material through apertures 65 in the top wall or ceiling 67 of the vessel. Lens 25A fitted into the apertures diverge the laser beams so the beam field substantially covers the width of the conveyor. Waste material falling off the conveyor or condensing on the walls and floor of the vessel drain down to a spill tank 69 formed at the bottom of the tank and are drawn off through drain 27A.

Figure 6:
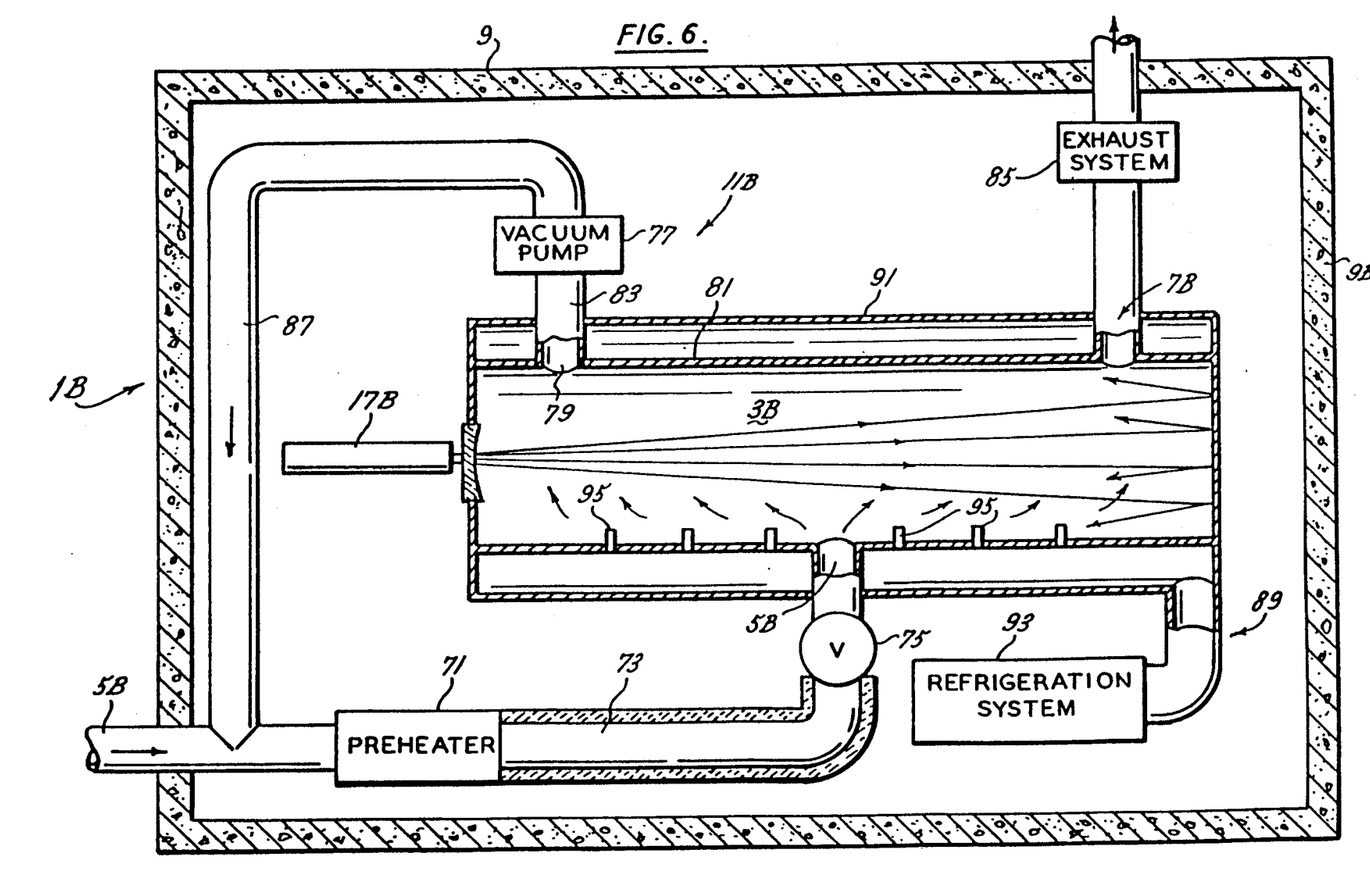
FIG. 6 is a schematic representation of a fifth possible construction of the apparatus; and, FIG. 7 is a schematic representation of another construction of the apparatus utilizing secondary toxic waste treatment.

Another embodiment of the invention is indicated IB in FIG. 6. As shown, reactive vessel 3B, which is cylindrical, has an inlet 5B connected to a preheater 71 which raises the temperature o the waste material from some nominal temperature. An inlet pipe 73 running from the preheater to inlet 5B includes an emergency shut-off valve 75 for stopping flow of waste material into the vessel. Ingress means 11B includes a vacuum pump 77 for drawing toxic waste material into the vessel via suction. The pump is connected to a suction port 79 formed in a sidewall 81 of vessel 3B by a pipe 83. A single laser beam is directed down the longitudinal axis of the vessel to incinerate the toxic waste. The outlet 7B of the vessel is connected to waste removing means or exhaust 85 by which the non-toxic waste. The outlet 7B of the vessel is connected to waste removing means for exhaust 85 by which the non-toxic waste is transported for disposal. Since some waste material will be pulled out of the vessel through port 79, a feedback pipe 87 is provided between the vacuum pump and the preheater.

Because high temperatures are present within the vessel, it is advisable to cool the sidewalls of the vessel to reduce temperature fatigue in the metal forming the sidewalls. For this purpose, apparatus IB includes a refrigeration means 89 comprising a jacket 91 encasing the vessel and a refrigeration system 93 for directing a coolant into the jacket. In addition, temperature sensors 95 are located along the inside wall of the vessel to provide a shut down signal to the control system of the apparatus, if the internal vessel temperature exceeds a predetermined level.

Turning to FIG. 7, apparatus 1C is shown in an integrated system in which solid or liquid toxic waste is transported to a disposal site in a tank car T. The material is pumped from the tank car and dissolved in a combustible and relatively safe solvent such as acetone, ethanol or propylene glycol. The solvent is stored in solvent tank 95 from which it is drawn through an outlet pipe 96 by a vacuum pump 97.

The resultant fluid mixture is pumped by a pump 98 to a reactive vessel 3C through a waste pipe 13C. The mixture is sprayed through nozzles 15C into the vessel. A pair of perforated pipes 101 and 103 extend horizontally across the vessel and are connected to a manifold 105. The manifold is connected to a vacuum system 107 which draws the toxic mist sprayed from the nozzles into pipes 101 and 103. A laser system 17C comprises three lasers 19C, two of which are oriented to direct their laser beams down the longitudinal axis of the respective pipes. As previously discussed, this aid incineration of toxic waste. In addition, the third laser is positioned to direct its beam across the lower portion of the vessel to incinerate waste particles not drawn into the pipes. A system of mirrors 109 are used to reflect laser energy throughout the interior of the vessel An electrolysis bath 31C is formed at the base of the reactor and anode 35C suspend from rods 37C and cathode 33C are used to produce an electrolyzing current through condensate collecting in the bath. A pump 111 draws residue through drain pipe 29C to feed toe remnants back through a feed back pipe 114 to waste pipe 13C.

Waste material drawn through manifold 105 is pulled by a compressor 115 into a second waste pipe 117 for discharge through a nozzle 119 into a second reactive vessel 121. A second laser system 123 includes a laser 125 which directs a high energy laser upward at the spray in manner similar to that described with respect to FIG. 1. Any remaining material is allowed to be drawn into a solvent bath 127 before being exhausted to the atmosphere through a vent 129.

A computer control 131 is used to operate the overall system. The control includes sensors such as the gas and toxic material sensors 133 positioned in the second reactive vessel to monitor any residual waste. The control also can shut down the system on an emergency basis if vessel temperatures get too high or a malfunction occurs.

Figure 8:
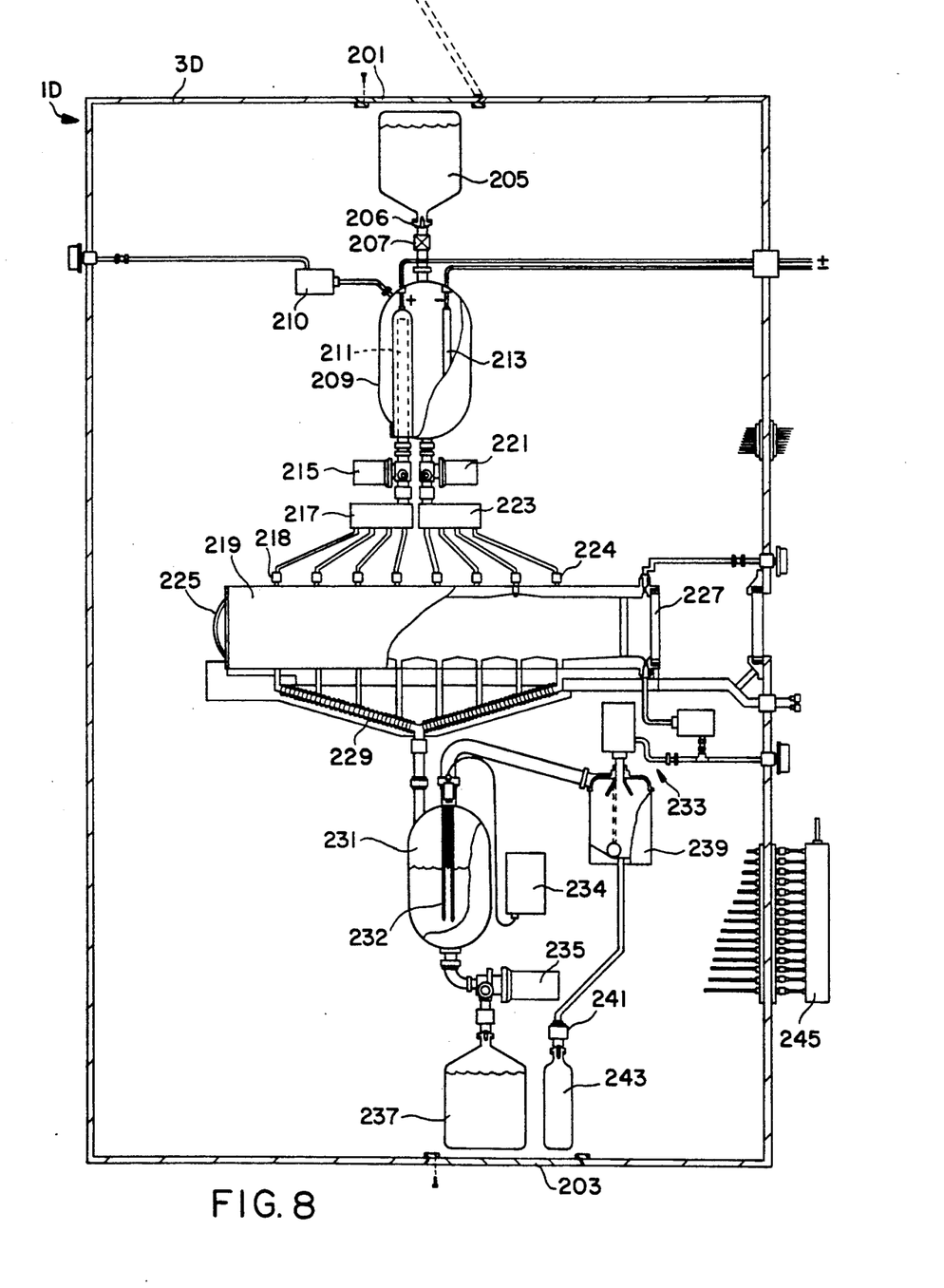
FIG. 8 is a schematic representation of another construction of the apparatus utilizing a novel electrolysis unit, another introduction system, and another enclosure and vacuum system.

Referring now to FIG. 8, an apparatus ID includes a casing 3D having an inlet door 201 and an outlet door 203. Liquid toxic product in a container 205 provided with a septum seal 210 is introduced into the casing 3D through the inlet door 203, and is attached to a pneumatic valve 207 by a quick-connect coupling which punctures the seal of the container 205. When the pneumatic valve 207 is opened, toxic product drains from the container 205 into a closed electrolysis chamber 209 evacuated by a vacuum pump 210. The electrolysis chamber 209 includes a brass cathode 213. A hollow, porous anode 211 is preferably formed of compressed carbon particles formed to act as a filter. Sintered metal anodes may also be used. The anode 211 acts as a filter, permitting the material drawn to the anode to pass through it and be drawn by a vacuum pump 215 into a metering manifold 217, and from there through a plurality of nozzles into a laser reaction chamber 219. The pump 215 and a companion pump 221 sequentially draw fluid from the anode 211 through manifold 217 and nozzles 218 into the chamber 219, then from the bottom of the electrolysis chamber 209 adjacent the cathode, through a similar manifold 223 and nozzles 224 into the chamber 219. The chamber 219 includes a water-cooled carbon laser absorber 225 at one end and a window 227 at the other. The window 227 is protected by a curtain of argon gas continuously blown across its inner face. The particulate material in the chamber 219 is subjected to the beam of a high-powered carbon dioxide laser. The resulting product is drained from the bottom of the chamber 219 through a water-jacketed chilled pipe 229, to a collection bottle 231. An intermittently operated vacuum system 233 produces a negative pressure differential between the collection bottle 231 and the chamber 219, thereby drawing the treated product into the collection bottle 231. Probes 232 in the collection bottle 231 provide an indication to a product level control 234 of a full collection bottle and trigger the operation of a pump 235 to empty the bottle 231 into a product removal container 237 before the level of liquid in the collection bottle 231 interferes with the vacuum system 233. The product removal container 237 may be identical with the container 205, and may include a self-healing septum seal for security in removing the container 237 through the outlet door 203. A trap 239 of the vacuum system 233 drains through a pneumatic valve 241 into an excess product container 243.

As is the case with the previous example, a computer system controls operation of the pneumatic controls 245 of this embodiment, in order to provide proper sequential operation of the valves. Internal vacuum pumps also provide proper pressure differentials, with exhaust gases being filtered to remove any potentially toxic components.

Numerous variations, within the scope of the appended claims, will be apparent to those skilled in the art in light of the foregoing description and accompanying drawings. Merely by way of example, in the last example, the internal pumps may be replaced by one or more external pumps having proper filtering. For example, a filtration system for removing the smoke plume of a medical laser, sold by Stackhouse Associates, Inc., El Segundo, Calif., under the trademark Stackhouse Point One System, may be modified for use as an external vacuum pump and filter.

Although the use of a laser beam is preferred, it is also possible to use other energy beams, including high energy X-ray (gamma ray) sources and other electromagnetic or particle sources. If a pulsed external particle source is used, the window of the vessel may include a small opening periodically opened by a rotating slotted shutter. Sources of ionizing radiation are preferred, particularly if the waste material is treated with the beam before electrolysis. Electrolysis of an ionized material will be understood to include the maintaining of separation between charged moieties and their electrical neutralization.

The system may be used for treating other materials, particularly primarily organic materials such as sludge.

These variations are merely illustrative.

I claim:

1. A method of detoxifying toxic organic waste material by a two step process, the method comprising in a desired order: a first step of subjecting the material to an energy beam by producing an energy beam within a vessel and directing the waste material through the beam, and a second step of electrolyzing said material; and thereafter a step of discharging the detoxified material from the vessel.

2. The method of claim 1 wherein the step of electrolyzing said material is after the step of subjecting the material to an energy beam, the step of electrolyzing comprising condensing particles as a liquid and electrolyzing the condensed liquid waste material.

3. The method of claim 1 wherein the step of subjecting the material to an energy beam includes directing a liquid waste material through the beam as a mist of particles.

4. The method of claim 1 wherein the electrolyzing step includes a step of drawing a portion of the waste material through a porous electrode.

5. The method of claim 1 wherein at least a part of the waste material is moved by intermittently applied vacuum.

6. Detoxification apparatus for safely disposing of toxic organic waste material by a two step process including treatment with an energy beam and electrolysis, the apparatus comprising: a closed reactive vessel having at least one inlet and at least one outlet; means for introducing the waste material into the vessel through the inlet; means for producing an energy beam within the vessel, means for exposing the waste material to the beam with the beam energy breaking down the waste material; electrolysis means for electrolyzing the waste material; and egress means for removing detoxified material from the vessel outlet.

7. The apparatus of claim 1 wherein the waste material is a liquid and wherein the apparatus includes nozzle means for introducing the waste material into the beam as a mist.

8. The apparatus of claim 1 including means for first introducing the waste material into the energy beam and for thereafter introducing the material treated by the energy beam into the electrolysis means.

9. The apparatus of claim 1 including means for first introducing the waste material into the electrolysis means and thereafter introducing fractions of the electrolyzed waste material into the beam.

10. The apparatus of claim 1 wherein the electrolysis means comprises a hollow, porous electrode.

11. The apparatus of claim 10 wherein the electrolysis means includes an inlet and an outlet said porous electrode being interposed between the inlet and outlet, whereby a portion of the electrolyzed waste material passes through the porous electrode.

12. The apparatus of claim 11 wherein the electrode is made of carbon particles.

13. The apparatus of claim 6 wherein the means for introducing the waste material comprises a conveyor.

14. The apparatus of claim 1 wherein the waste material is a liquid and wherein the apparatus includes intermittently operated vacuum means for moving the waste material through at least a part of the apparatus.

* * * * *